United States Patent
Nam et al.

(10) Patent No.: US 10,675,932 B2
(45) Date of Patent: Jun. 9, 2020

(54) DUAL-MODE VEHICLE WITH WHEEL ROTORS

(71) Applicant: Toyota Motor Engineering & Manufacturing North America, Inc., Erlanger, KY (US)

(72) Inventors: Taewoo Nam, Ann Arbor, MI (US); Yasuo Uehara, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 312 days.

(21) Appl. No.: 15/453,566

(22) Filed: Mar. 8, 2017

(65) Prior Publication Data
US 2018/0257447 A1    Sep. 13, 2018

(51) Int. Cl.
| | |
|---|---|
| B60F 5/02 | (2006.01) |
| B64C 37/00 | (2006.01) |
| B64C 11/28 | (2006.01) |
| B60F 5/00 | (2006.01) |
| A63H 27/00 | (2006.01) |
| B64C 25/36 | (2006.01) |

(52) U.S. Cl.
CPC ............... *B60F 5/02* (2013.01); *A63H 27/12* (2013.01); *B60F 5/00* (2013.01); *B64C 11/28* (2013.01); *B64C 37/00* (2013.01); *B64C 25/36* (2013.01)

(58) Field of Classification Search
CPC ... B60F 5/02; B60F 5/00; B64C 37/00; B64C 11/28; B64C 11/46; B64C 27/20; B64C 2201/162; B64C 2201/165; A63H 27/12
See application file for complete search history.

(56) References Cited

U.S. PATENT DOCUMENTS

| | | | |
|---|---|---|---|
| 2,966,317 | A | 12/1960 | Ramniceanu |
| 4,436,261 | A | 3/1984 | Koleff |
| 7,959,104 | B2 | 6/2011 | Kuntz |
| 8,794,564 | B2 | 8/2014 | Hutson |

(Continued)

FOREIGN PATENT DOCUMENTS

WO    2013182708 A1    12/2012

OTHER PUBLICATIONS

U.S. Appl. No. 14/697,576.
(Continued)

*Primary Examiner* — Jessica B Wong
(74) *Attorney, Agent, or Firm* — Christopher G. Darrow; Darrow Mustafa PC

(57) ABSTRACT

A dual-mode vehicle, wheels for the vehicle, and a method of transitioning the vehicle from a land mode to a flight mode. In the land mode, the method includes rotating a pair of spaced wheel arms about a central pivot to lower a body of the dual-mode vehicle to a ground surface. Each wheel arm extends from the central pivot to a wheel. The method also includes rotating the central pivot about a longitudinal vehicle axis to raise the wheel arms and the wheels above the ground surface. After raising the wheel arms and wheels above the ground surface, the method includes rotating the wheel arms about the central pivot to position the wheels for use as rotors in the flight mode. In the flight mode, the method includes rotating the wheels in order to extract rotor blades positioned within the wheels to extend beyond the wheels.

15 Claims, 3 Drawing Sheets

(56) References Cited

U.S. PATENT DOCUMENTS

| | | |
|---|---|---|
| 8,794,566 B2 | 8/2014 | Hutson |
| 8,827,200 B2 | 9/2014 | Radu |
| 8,991,740 B2 | 3/2015 | Olm et al. |
| 9,364,766 B2 | 6/2016 | Mielniczek |
| 2008/0048065 A1 | 2/2008 | Kuntz |
| 2009/0274557 A1* | 11/2009 | Vasyl .................... B64C 11/003 416/89 |
| 2010/0181414 A1 | 7/2010 | Lopez, Jr. |
| 2014/0034776 A1 | 2/2014 | Hutson |
| 2014/0061362 A1 | 3/2014 | Olm et al. |
| 2014/0191565 A1 | 7/2014 | Gebeau |
| 2015/0093956 A1 | 4/2015 | Mielniczek |
| 2016/0121673 A1 | 5/2016 | Hutson |
| 2016/0122015 A1 | 5/2016 | Hutson |
| 2016/0130000 A1 | 5/2016 | Rimanelli |
| 2016/0176514 A1 | 6/2016 | Lavagen et al. |
| 2016/0221671 A1* | 8/2016 | Fisher ..................... B64C 27/08 |
| 2016/0229534 A1 | 8/2016 | Hutson |
| 2016/0311282 A1 | 10/2016 | Nam et al. |
| 2018/0072410 A1* | 3/2018 | Johnson ................ B64C 27/473 |
| 2018/0155016 A1* | 6/2018 | Tian ........................ B64C 27/08 |

OTHER PUBLICATIONS

Vitenzo Ltd.; "Instruction Manual B-Ex 5 Channel Outdoor Flying Car"; Instruction Manual; May 1, 2014; in 30 pages; London, United Kingdom.

* cited by examiner

DUAL-MODE VEHICLE WITH WHEEL ROTORS

BACKGROUND

A dual-mode vehicle is a vehicle that can be both driven on the road in a land mode and takeoff, fly, and land as an aircraft in a flight mode. Vehicles that demonstrate such capabilities provide operators with expanded private travel options. Such vehicles, however, can require physical tradeoffs in design in order to facilitate operations in both the land mode and the flight mode.

For example, existing dual-mode vehicles with vertical take-off and landing (VTOL) capabilities include separate power sources for the rotors used in the flight mode and the wheels used in the land mode, adding weight and complexity to the dual-mode vehicle. Existing dual-mode vehicles with VTOL capabilities that implement wheel-based rotors are generally limited in rotor length to the diameter of the wheel and further lack rotor protection, restricting the overall size and weight of the dual-mode vehicle and subjecting the rotors to damage in the land mode.

SUMMARY

A dual-mode vehicle, wheel-based rotors for the dual mode vehicle, and a method of transitioning the dual-mode vehicle from a land mode to a flight mode are disclosed. The dual-mode vehicle includes a suspension system comprised of four wheel arms extending from two central pivots, one on each side of the dual-mode vehicle. Four wheels, one each at the end of a wheel arm, function in a traditional manner in the land mode of the dual-mode vehicle. Each wheel also includes at least one rotor housed fully within the rim of the wheel beneath a wheel cover in the land mode. To transition to the flight mode, the wheel arms lower the body of the dual-mode vehicle to a ground surface by pivoting about the central pivots. Once the body of the dual-mode vehicle is positioned on the ground surface, the wheel arms and central pivot rotate about a longitudinal axis of the vehicle to raise the wheels off of the ground surface. Upon rotation of the wheels, the rotor(s) within each wheel automatically extends beyond the rim of the wheel to a position configured to generate lift for the dual-mode vehicle.

In one implementation, a dual-mode vehicle is disclosed. The dual-mode vehicle includes a central pivot rotatable about a longitudinal vehicle axis, a pair of spaced wheel arms rotatable about the central pivot, and a pair of wheels. Each wheel in the pair of wheels is disposed on one of the wheel arms and includes a rim defining a recess within an interior of the wheel and a rotor blade positioned within the recess in a land mode of the dual-mode vehicle and positioned exterior to the rim in a flight mode of the dual-mode vehicle.

In another implementation, a wheel for a dual-mode vehicle is disclosed. The wheel includes a rim defining a recess within an interior of the wheel, a rotor blade positioned within the recess in a land mode of the dual-mode vehicle and positioned exterior to the rim in a flight mode of the dual-mode vehicle, and a wheel cover positioned adjacent to the rim and covering the rotor blade in the land mode.

In another implementation, a method of transitioning a dual-mode vehicle from a land mode to a flight mode is disclosed. In the land mode, the method includes rotating a pair of spaced wheel arms about a central pivot to lower a body of the dual-mode vehicle to a ground surface. Each wheel arm extends from the central pivot to a wheel. The method further includes rotating the central pivot about a longitudinal vehicle axis to raise the wheel arms and the wheels above the ground surface. After raising the wheel arms and wheels above the ground surface, the method includes rotating the wheel arms about the central pivot to position the wheels for use as rotors in the flight mode. In the flight mode, the method includes rotating the wheels in order to extract rotor blades positioned within the wheels to extend beyond the wheels.

BRIEF DESCRIPTION OF THE DRAWINGS

The description herein makes reference to the accompanying drawings wherein like reference numerals refer to like parts throughout the several views, and wherein.

DETAILED DESCRIPTION

An improved design for wheel-based rotors for a dual-mode vehicle is described below. Each wheel on the dual-mode vehicle includes a rim defining a recess within an interior of the wheel and at least one rotor blade positioned within the recess in a land mode of the dual-mode vehicle. Each wheel also includes a wheel cover positioned adjacent to the rim and covering the rotor blade in the land mode. Upon transition from the land mode to a flight mode, the body of the dual-mode vehicle is lowered to a ground surface and the wheels are rotated about a longitudinal vehicle axis to raise the wheels into the air. Once in the air, each wheel cover is spaced slightly from its respective wheel, the wheels are rotated, and the rotor blade(s) within each wheel is extended by rotational inertia to a position exterior to the wheel rim. With sufficient rotation, the rotor blade(s) generates lift to allow the dual-mode vehicle to achieve flight.

Figure 1:
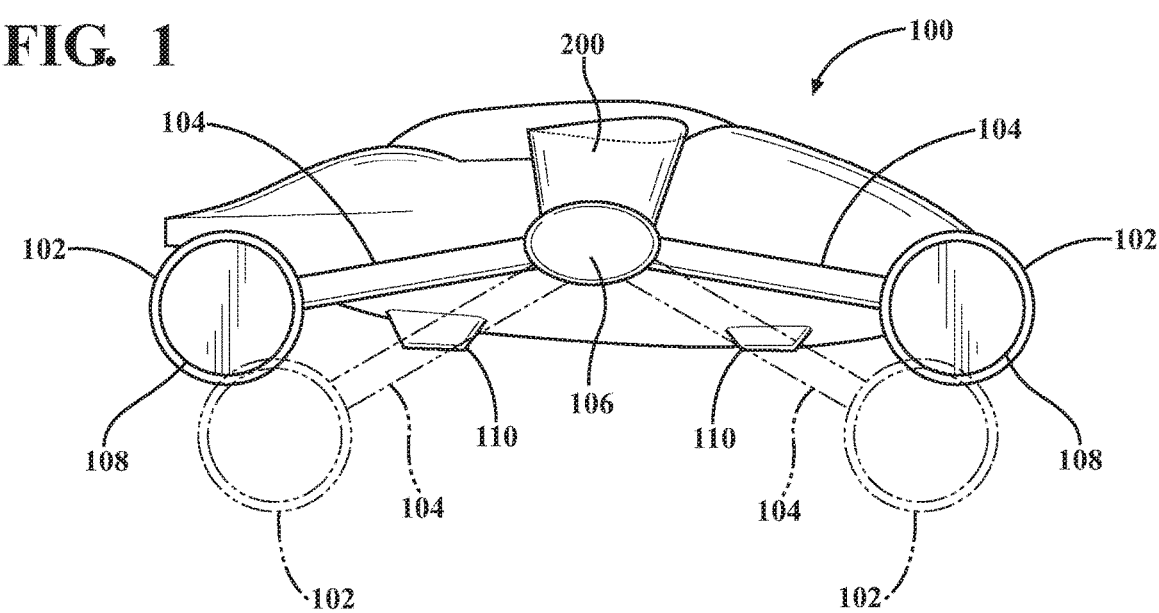
FIG. 1 is a side view of a dual-mode vehicle in a land mode.

FIG. 1 is a side view of a dual-mode vehicle 100 in a land mode, that is, in a configuration suitable for driving the dual-mode vehicle 100 on the road. The body of the dual-mode vehicle 100 can be supported on the road by a plurality of wheels 102. Each wheel 102 is coupled to a wheel arm 104 that extends from a central pivot 106 anchored to the body of the dual-mode vehicle 100. Each wheel 102 can also be driven by an electric motor powered by a power system (see FIG. 7). The power system can include a battery pack, a gas turbine generator, a fuel cell, or any other energy conversion device capable of generating sufficient electric power to drive the wheels 102 of the dual-mode vehicle 100. Steering of the dual-mode vehicle 100 in the land mode can be accomplished by, for example, changing the speed of the wheels 102 on one side of the dual-mode vehicle 100.

Each wheel 102 on the dual-mode vehicle 100 can include a wheel cover 108. The wheel covers 108 can be designed such that rotor blades used to create lift in the flight mode can be stored within the wheels 102 when the dual-mode vehicle 100 operates in the land mode. By storing the rotor blades within the wheels 102 beneath the wheel covers 108, the rotor blades can be protected from damage during operation in the land mode. Further, the use of wheel covers 108 can improve the fuel economy of the dual-mode vehicle 100 in the land mode by reducing drag at higher speeds.

FIG. 1 also shows that that the wheels arms 104 are configured to rotate about the central pivot 106. By rotating the wheel arms 104 about the central pivot 106, the attitude, or ride height, of the dual-mode vehicle 100 can be adjusted on the road. For example, a lower ride height position is shown by the wheels 102 and the wheel arms 104 in a solid outline. The lower ride height, with the body of the dual-mode vehicle 100 close to a ground surface, is suitable for high-speed driving and can improve fuel economy and stability. Alternatively, a higher ride height is shown by the wheels 102 and wheel arms 104 in a dotted line outline. The higher ride height, with the body of the dual-mode vehicle 100 spaced above the ground surface, can be suitable for lower speed urban driving and can improve visibility. Thus, the wheel arms 104 serve as a variable ride height suspension system for the dual-mode vehicle 100 in the land mode and can include either lever-arm style shock absorbers or linear shock absorbers located at the interface to the wheels 102.

The body of the dual-mode vehicle 100 also includes a pair of stabilizers 110. The stabilizers 110 allow the dual-mode vehicle 100 to rest on the ground surface in an upright position in absence of support from the wheels 102. The stabilizers 110 are used during the transition from the land mode to the flight mode after the wheel arms 104 are rotated about the central pivot 106 to a point where the body of the dual-mode vehicle 100 comes in contact with the ground surface. The transition from land mode to flight mode is described further below.

Figure 2:
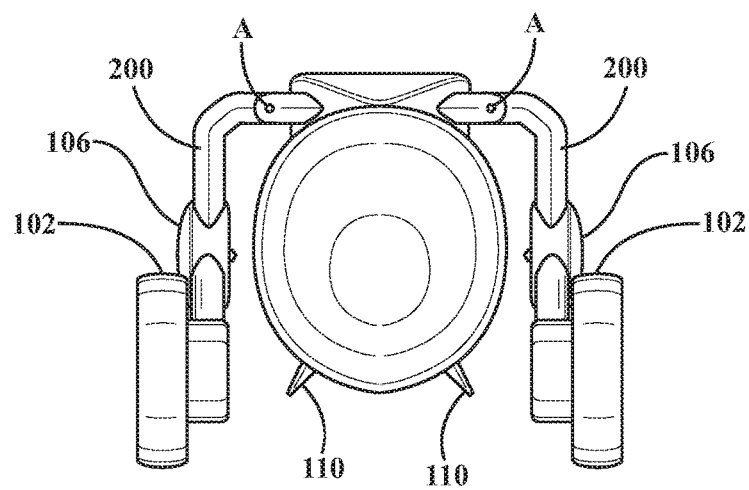
FIG. 2 is a front view of the dual-mode vehicle of FIG. 1 in the land mode.

FIG. 2 is a front view of the dual-mode vehicle 100 of FIG. 1 in the land mode. In this view, two central pivots 106 are shown as spaced from the main body of the dual-mode vehicle 100, each central pivot 106 anchored to a support arm 200. The wheel arms 104 extend from the central pivots 106 to wheels 102 located on the ground surface in the land mode. The support arms 200 are configured to rotate about longitudinal vehicle axes A-A during the transition from the land mode to the flight mode. The stabilizers 110 are shown on the lower surface of the body of the dual-mode vehicle 100 in a spacing sufficient to support the body in an upright position in the absence of the wheels 102, for example, after the support arms 200 have rotated about the longitudinal vehicle axes A-A.

Figure 3:
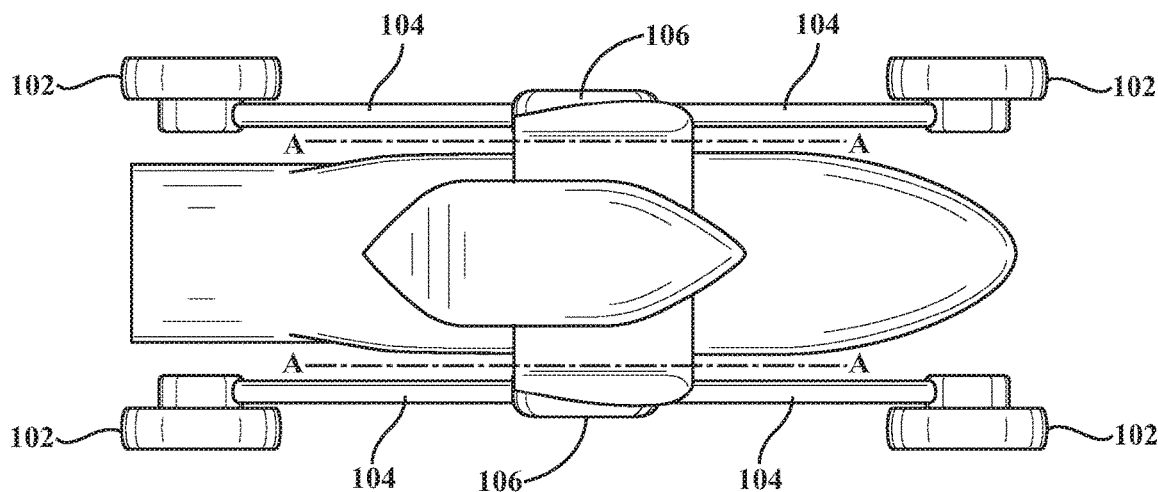
FIG. 3 is a top view of the dual-mode vehicle of FIG. 1 in the land mode.

FIG. 3 is a top view of the dual-mode vehicle 100 of FIG. 1 in the land mode. In this view, four wheel arms 104 are shown extending from two central pivots 106. The two central pivots 106 are shown anchored to the two support arms 200. The support arms 200 are shaped to improve aerodynamics in both the land mode and the flight mode. The longitudinal vehicle axes A-A are shown as running the length of the dual-mode vehicle 100 through, for example, a hinged section of the support arms 200. Again, each central pivot 106 is rotatable about its respective longitudinal vehicle axes A-A to assist in transition from the land mode to the flight mode.

Figure 4:
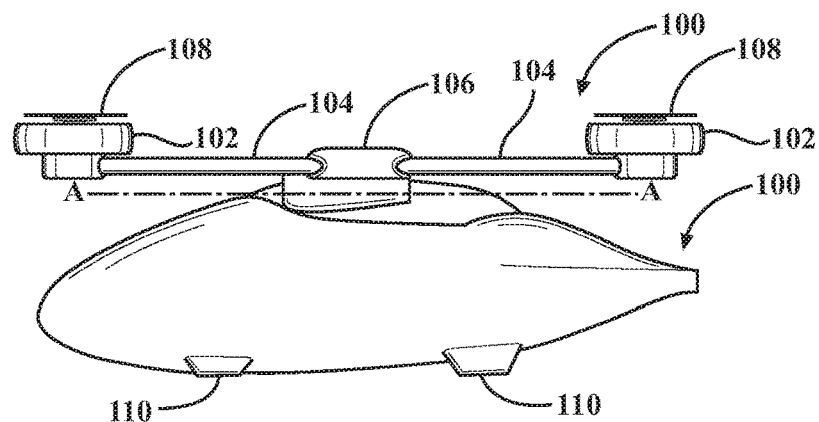
FIG. 4 a side view of the dual-mode vehicle of FIG. 1 in the flight mode.

FIG. 4 is a side view of the dual-mode vehicle 100 of FIG. 1 in the flight mode. In this example, the central pivot 106 has rotated approximately 90 degrees about the longitudinal vehicle axis A-A from the land mode position as shown in FIGS. 1-3. To achieve this transition, the wheel arms 104 were first rotated about the central pivot 106 to lower the body of the dual-mode vehicle 100 to rest on the stabilizers 110 on a ground surface before rotating the central pivot 106 about the longitudinal vehicle axis A-A to raise the wheel arms 104 and the wheels 102 into the air. Additionally, the wheel covers 108 have been spaced slightly from the wheels 102 to allow access for rotor blades stored within an interior recess of the wheels 102 to be extracted from the wheels 102.

Figure 5:
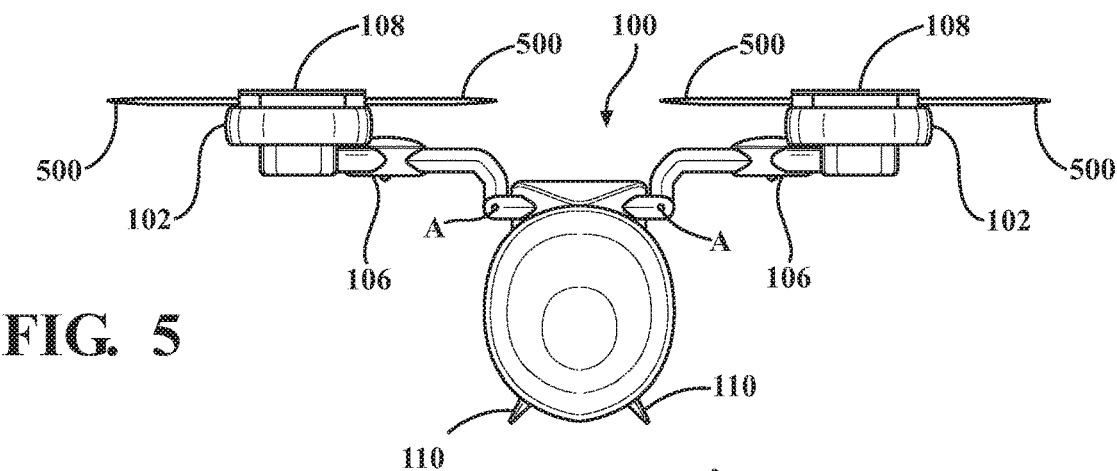
FIG. 5 is a front view of the dual-mode vehicle of FIG. 1 in the flight mode.

FIG. 5 is a front view of the dual-mode vehicle 100 of FIG. 1 in the flight mode. In this view, four rotor blades 500 have been extracted from two wheels 102. In order to extract the rotor blades 500, the wheel covers 108 are spaced from the wheels 102 just enough to allow the rotor blades 500 to be automatically positioned in the extended location shown by rotational inertia, for example, by driving the wheels 102 to rotate using a motor. The rotor blades 500 can also include, for example, a spring hinge at the connection location within the wheels 102, the spring hinge being designed to return the rotor blades 500 to positions beneath the wheel covers 108 when rotational inertia is removed, that is, when the wheels 102 are no longer spinning. Alternatively, the wheels 102 can be designed to include a clutch to separate rotation of the wheels 102 from rotation of the rotor blades 500 extending from the wheels 102.

Figure 6:
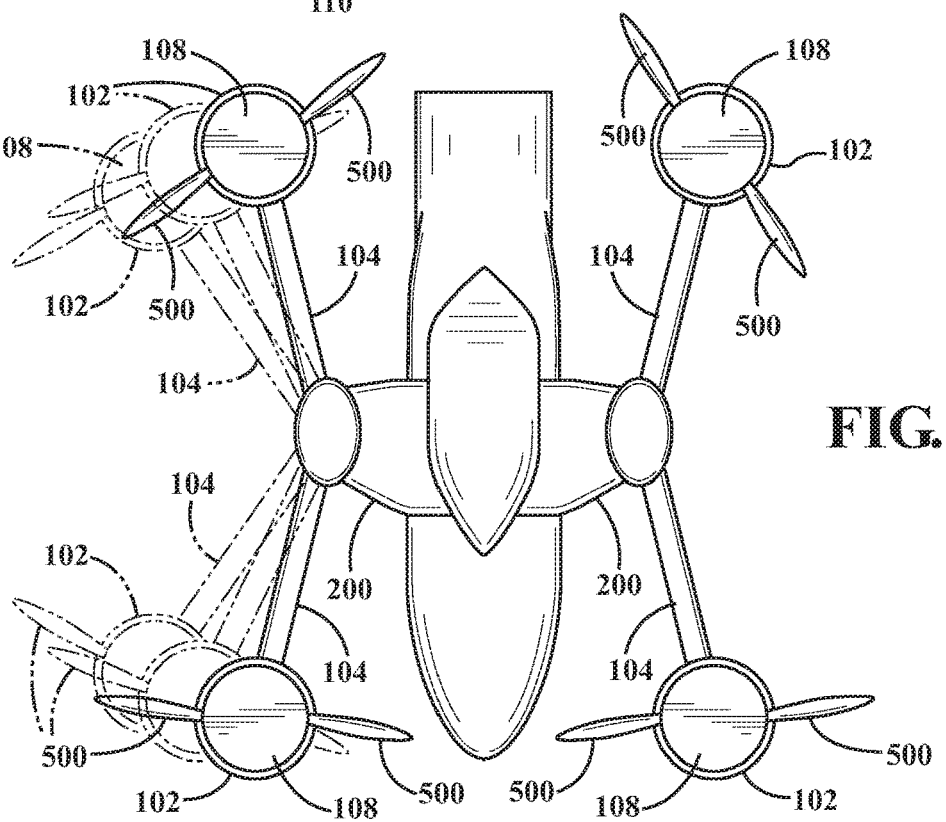
FIG. 6 is a top view of the dual-mode vehicle of FIG. 1 in the flight mode.

FIG. 6 is a top view of the dual-mode vehicle 100 of FIG. 1 in the flight mode. In this view, eight rotor blades 500 are shown as extracted from four wheels 102. Each wheel 102 is shown in two separate positions, one solid and one dotted line, based on rotation of the wheel arms 104 about the central pivots 106. The wheels arms 104 are configured to rotate about the central pivots 106 in the flight mode in order to better position the wheels 102 and the rotor blades 500 to account for weight distribution within the body of the dual-mode vehicle 100. In addition, since the wheel arms 104 can vary the position of the wheels 102 and the rotor blades 500 above the body of the dual-mode vehicle 100, the dual-mode vehicle 100 generate sufficient lift to achieve flight even if one or more of rotor blades 500 malfunctions.

Though the embodiment of the dual-mode vehicle 100 shown in FIGS. 1-6 includes four wheels 102, four wheel arms 104, two central pivots 106, and two support arms 200, allowing for lift generation in the style of a quad copter in the flight mode and for traditional vehicle handling in the style of a passenger vehicle in the land mode, other configurations are also possible. Further, though the embodiment shown in FIGS. 1-6 includes two rotor blades 500 within each of the wheels 102, allowing the length of each rotor blade 500 to span approximately the diameter of the wheel 102 and maximize lift generation, other embodiments of the dual-mode vehicle 100 can be designed with a different numbers of rotor blades 500 within each of the wheels 102. For example, a single rotor blade 500 could be used or three slightly shorter rotor blades 500 could be equally spaced within each wheel 102 in a triangular storage pattern.

In another embodiment, the central pivots 106 could be directly anchored to the body of the dual-mode vehicle 100 and be configured to allow the wheel arms 104 to rotate directly about the longitudinal vehicle axes A-A without use of the support arms 200. In another embodiment, the dual-mode vehicle 100 could include only two wheels 102, two wheel arms, and one central pivot 106 in the style of a motorcycle or bicycle. Each of these embodiments takes advantage of the automatically extracting wheel-based rotor blades 500, the mechanism of which is further described below.

Figure 7:
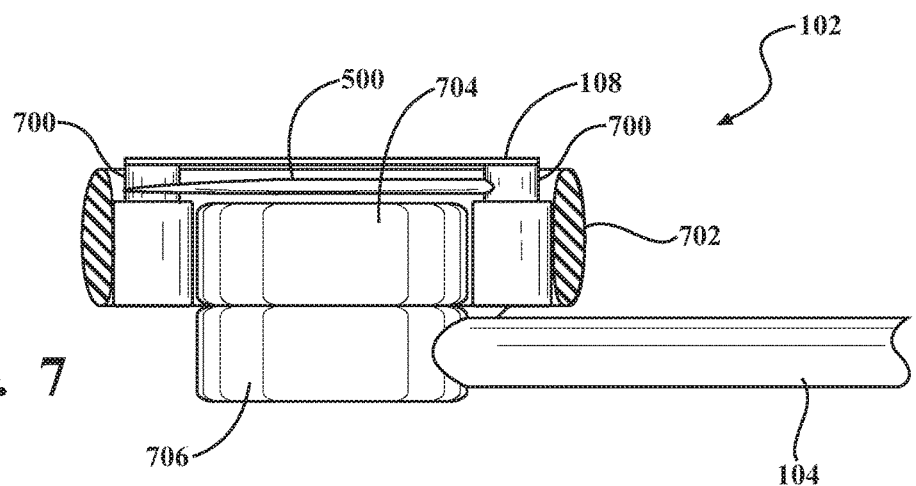
FIG. 7 is cross-sectional view of a wheel on the dual-mode vehicle of FIG. 1 in the land mode.

FIG. 7 is cross-sectional view of a wheel 102 on the dual-mode vehicle 100 of FIG. 1 in the land mode. In this example, the wheel cover 108 is attached to the wheel using a pair of stanchions 700. The stanchions 700 are located within a recess in the interior of the wheel 102, for example, as would be defined by a rim 702 of the wheel 102. Each rotor blade 500 is rotatably attached to one stanchion 700 and is configured to be stored within the recess of the wheel 102 under the wheel cover 108 in the land mode. Thus, the rotor blades 500 can be protected from damage during land-mode operation and fuel economy can be improved at higher vehicle speeds. In this example, the power system for the wheel 102 is an electric motor that drives rotation of the rim 702. The electric motor consists of two parts: the stanchions 700 and the rim 702 are coupled to a rotor 704 and the rotor 704 is coupled to a stator 706. The rotor 704 and the stator 706 function in a traditional manner.

Figure 8:
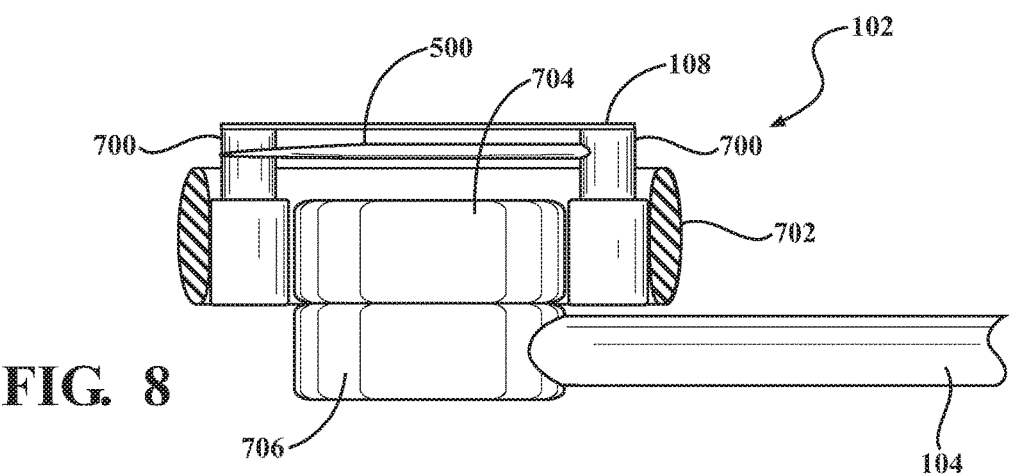
FIG. 8 is a cross-sectional view of the wheel on the dual-mode vehicle of FIG. 1 during the transition between the land mode and the flight mode.

FIG. 8 is a cross-sectional view of the wheel 102 on the dual-mode vehicle 100 of FIG. 1 during the transition between the land mode and the flight mode. In this example, the wheel cover 108 has been spaced apart from the rim 702 of the wheel 102 by extending the stanchions 700. Similarly, the rotor blades 500 coupled to the stanchions 700 have been lifted from the stored position within the recess of the wheel 102. The wheel cover 108 is still positioned over the rotor blades 500 in respect to the interior of the wheel 102, but the gap between the wheel cover 108 and the rim 702 is such that the rotor blades 500 are able to be extracted from the shown folded position upon sufficient rotation of the wheel 102.

Figure 9:
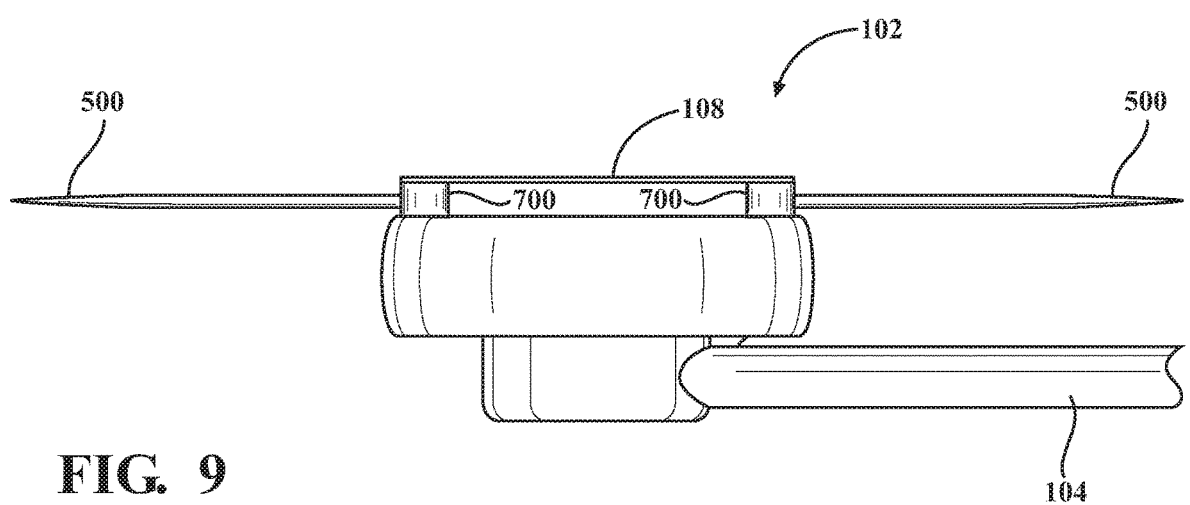
FIG. 9 is a side view of the wheel on the dual-mode vehicle of FIG. 1 in the flight mode.

FIG. 9 is a side view of the wheel 102 on the dual-mode vehicle 100 of FIG. 1 in the flight mode. In this example, the rotor blades 500 have been extended beyond the perimeter of the wheel 102, that is, outside of the rim 702, using rotational inertia. Here, rotating the wheel 102 will swing the rotor blades 500 about the stanchions 700 approximately 180 degrees to a position where the rotor blades 500 are fully extended, that is, approximately normal to the surface of the wheel 102. Once the wheel 102 slows its rotation, the rotor blades 500 can be automatically folded back beneath the wheel cover 108 based on a spring hinge at the connection between the rotor blades 500 and the stanchions 700.

As described previously, a different number of rotor blades 500 can be used with each wheel 102 or the wheel 102 and rotor blades 500 can be designed with an internal clutch that separates the rotation of the wheels 102 from the rotation of the rotor blades 500. Similarly, though two stanchions 700 are shown as disposed along the rim 702 beneath the wheel cover 108, a configuration that is optimized to combat bending moments caused by the rotation of the rotor blades 500, a different number of stanchions 700 or a different position for the stanchions 700 is also possible.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A dual-mode vehicle, comprising:
   a central pivot configured to rotate about a longitudinal vehicle axis;
   a pair of spaced wheel arms configured to rotate about the central pivot; and
   a pair of wheels;
   each wheel being disposed on one of the wheel arms; and
   each wheel including:
      a rim defining a recess within an interior of the wheel; and
      a rotor blade positioned within the recess in a land mode of the dual-mode vehicle and positioned exterior to the rim in a flight mode of the dual-mode vehicle.

2. The dual-mode vehicle of claim 1, wherein rotating the wheel arms about the central pivot modifies a ride height of the dual-mode vehicle in the land mode.

3. The dual-mode vehicle of claim 1, wherein each wheel further includes a wheel cover positioned adjacent to the rim and covering the rotor blade in the land mode.

4. The dual-mode vehicle of claim 3, wherein the wheel cover is spaced from the rim in the flight mode allowing the rotor blade to transition from its position within the recess in the land mode to its position exterior to the rim in the flight mode.

5. The dual-mode vehicle of claim 1, wherein each wheel further includes a stanchion disposed within the recess.

6. The dual-mode vehicle of claim 5, wherein the rotor blade is rotatable about the stanchion between its position within the recess in the land mode and its position exterior to the rim in the flight mode.

7. The dual-mode vehicle of claim 6, wherein rotational inertia of the rim causes the rotor blade to rotate about the stanchion between its position within the recess in the land mode and its position exterior to the rim in the flight mode.

8. The dual-mode vehicle of claim 1, further comprising:
   a plurality of stabilizers for positioning the dual-mode vehicle in respect to a ground surface during a transition between the land mode and the flight mode.

9. The dual-mode vehicle of claim 8, wherein the transition between the land mode and the flight mode includes rotating the central pivot about the longitudinal vehicle axis to raise the wheel arms and the wheels above the ground surface.

10. A method of transitioning a dual-mode vehicle from a land mode to a flight mode, comprising:
    in the land mode, rotating a pair of spaced wheel arms about a central pivot to lower a body of the dual-mode vehicle to a ground surface wherein each wheel arm extends from the central pivot to a wheel;
    rotating the central pivot about a longitudinal vehicle axis to raise the wheel arms and the wheels above the ground surface;
    after raising the wheel arms and wheels above the ground surface, rotating the wheel arms about the central pivot to position the wheels for use as rotors in the flight mode; and
    in the flight mode, rotating the wheels in order to extract rotor blades positioned within the wheels to extend beyond the wheels.

11. The method of claim 10, wherein the dual-mode vehicle includes a plurality of stabilizers for positioning the dual-mode vehicle in respect to the ground surface during the transition between the land mode and the flight mode.

12. The method of claim 10, wherein each wheel includes a rim defining a recess within an interior of the wheel.

13. The method of claim 12, wherein each rotor blade is positioned within the recess in the land mode and positioned exterior to the rim in the flight mode.

14. The method of claim 13, wherein each wheel includes a wheel cover positioned adjacent to the rim and covering the rotor blade in the land mode.

15. The method of claim 14, wherein the wheel cover is spaced from the rim in the flight mode allowing the rotor blade to transition from its position within the recess in the land mode to its position exterior to the rim in the flight mode.

* * * * *